United States Patent [19]

Steketee, Jr.

[11] Patent Number: 5,034,180

[45] Date of Patent: Jul. 23, 1991

[54] METHOD FOR INSTALLING A SUBSTANTIALLY RIGID THERMOPLASTIC PIPE IN AN EXISTING PIPELINE

[75] Inventor: Campbell H. Steketee, Jr., Salem, Oreg.

[73] Assignee: NuPipe, Inc., Memphis, Tenn.

[21] Appl. No.: 249,452

[22] Filed: Sep. 26, 1988

Related U.S. Application Data

[63] Continuation-in-part of Ser. No. 180,904, Apr. 13, 1988, which is a continuation-in-part of Ser. No. 76,973, Jul. 28, 1987, Pat. No. 4,867,921, which is a continuation of Ser. No. 846,322, Mar. 31, 1986, abandoned.

[51] Int. Cl.⁵ .............................................. B29C 63/34
[52] U.S. Cl. ..................................... 264/516; 156/287; 156/294; 264/573; 264/269
[58] Field of Search ................. 264/36, 516, 269, 573, 264/564, 566; 156/153, 286, 287, 294; 285/369; 138/97, 98

[56] References Cited

U.S. PATENT DOCUMENTS

| | | | |
|---|---|---|---|
| 2,974,758 | 9/1954 | Harper et al. | 156/287 |
| 3,080,269 | 3/1963 | Pollack et al. | 264/516 |
| 4,273,605 | 6/1981 | Ross | 156/286 |
| 4,627,471 | 12/1986 | Parkes et al. | 138/97 |
| 4,643,465 | 2/1987 | Green et al. | 285/236 |
| 4,744,842 | 5/1988 | Webster et al. | 156/153 |

FOREIGN PATENT DOCUMENTS

| | | |
|---|---|---|
| 1194264 | 3/1982 | Canada . |
| 1394807 | 3/1965 | France . |
| 2503622 | 10/1982 | France . |
| 53-58580 | 5/1978 | Japan ............................ 156/287 |
| 55-31473 | 3/1980 | Japan . |
| 2018384 | 10/1979 | United Kingdom . |

Primary Examiner—Jan H. Silbaugh
Assistant Examiner—Mathieu Vargot
Attorney, Agent, or Firm—Blum Kaplan

[57] ABSTRACT

A thin, flexible tubular membrane provides a heat containment tube for inserting into and inflation within an underground conduit to be repaired. Folded rigid thermoplastic pipe is inserted into the tube while hot and flexible. The tubular membrane is pressurized to exclude unwanted fluids from within the existing conduit. Hot stem is injected into the tube to heat the pipe full-length externally and internally until flexible. The pipe is then rounded and expanded against the walls of the conduit with the tube therebetween. The rounding and expanding of the pipe is carried out progressively by moving a plug through the pipe and by injecting hot steam under pressure behind the plug.

20 Claims, 4 Drawing Sheets

1

METHOD FOR INSTALLING A SUBSTANTIALLY RIGID THERMOPLASTIC PIPE IN AN EXISTING PIPELINE

REFERENCE TO RELATED APPLICATIONS

This application is a continuation-in-part of application Ser. No. 180,904, filed Apr. 13, 1988, which in turn is a continuation-in-part of application Ser. No. 76,973, filed July 28, 1987, now U.S. Pat. No. 4,867,921, which in turn is a continuation of application Ser. No. 846,322, filed Mar. 31, 1986 and now abandoned.

INCORPORATION BY REFERENCE

The disclosures of the prior related applications as set forth above are incorporated herein by reference.

BACKGROUND OF THE INVENTION

The present invention relates to improvements in methods and apparatuses as described in the prior related application for installing replacement pipe inside an existing underground conduit using rigid thermoplastic pipe as the replacement pipe. This application, like the prior related applications, is concerned with such installation while the thermoplastic pipe is in a collapsed, folded, heated and flexible condition.

The present invention is especially concerned with solving the problems of (1) maintaining especially large diameters and long lengths of thermoplastic pipe in a heated and flexible condition during their insertion into underground conduit, and especially such conduit that may contain standing water and other fluids that tend to cool the thermoplastic pipe during the insertion process; (2) expelling standing or flowing fluids found within an existing conduit and preventing additional fluids from flowing into the existing conduit; (3) rounding and expanding the thermoplastic pipe from its folded condition after insertion so that the new pipe fits smoothly and tightly against the interior walls of the existing conduit without trapping bubbles of air or liquids between the existing and new pipes and without causing wrinkles to form at irregularities in the existing pipe; (4) relieving the longitudinal stresses in the new plastic pipe after it has been heated and expanded against the walls of the existing conduit to prevent stress fractures, especially where holes are cut in the new pipe for connecting a lateral service pipe; (5) interconnecting a new pipe within an existing main conduit and a new pipe within an existing service conduit that intersects the main conduit; (6) quickly and thoroughly heating a spool of the folded thermoplastic pipe for insertion at a job site to render it flexible for unspooling and insertion into a conduit and maintaining the high temperature and flexibility of the pipe after it is unspooled and while it is inserted into long runs of underground conduit; and (7) repairing relatively short sections of long underground conduit remote from an access opening into the conduit.

DISCUSSION OF THE PRIOR ART

The prior art relevant to the methods and apparatuses of this invention is for the most part disclosed in the prior referenced related applications and reference is made to such prior applications and their information disclosure statements for listings and copies of such prior art. In addition, published British application number 2018384 A, published Oct. 17, 1979, and British Patent 1039836, published Aug. 24, 1966, disclose the concept of forcing a traveling ball through a flexible pipe liner within an existing pipeline under fluid pressure to expand the liner against the interior walls of the existing pipe and to bond the liner to the pipe with an adhesive carried by the liner. However such prior publications are not concerned with the need to heat to render flexible a folded, normally rigid thermoplastic pipe and to unfold, round and expand such pipe against the walls of an existing conduit and then cool the pipe so that it sets in its expanded condition. Nor are they concerned with the need to heat and render flexible a rigid folded pipe ahead of the plug by allowing some of the heated pressure fluid behind the plug to by-pass the plug. Nor are such prior publications concerned with controlling the speed of travel of the plug through the unfolding new pipe to insure that proper heating and flexing of the new pipe ahead of the plug occurs.

SUMMARY OF THE INVENTION

The present invention seeks to overcome the foregoing problems that have been encountered in performing the processes of the afore-mentioned prior related applications by incorporating in the processes of such prior applications the following features, methods, and apparatuses:

1. A heat containment tube consisting of a thin, flexible, tubular membrane manufactured from any material which is strong, pliable, air and water tight, and able to withstand live steam and high temperatures, is used to facilitate efficient heating of the thermoplastic pipe after it has been installed in the existing conduit in its folded condition so that it can then be rendered and maintained flexible throughout its length. The heat containment tube may also be used to expell or prevent entrance of fluids in the existing pipeline if such fluids would inhibit adequate heating of the new pipe. The heat containment tube is installed in the existing pipe and at least partially inflated before insertion of the new thermoplastic pipe in its folded condition. A hot fluid is then conveyed through a hose into one end of the heat containment tube. The other end may be closed, thereby forcing the hot fluid down the length of the tube outside the plastic pipe and back up the tube through the plastic pipe to heat such pipe both externally and internally. Alternatively, the other end can be restricted but not completely closed to allow the hot fluid to vent there after flowing through the tube both inside and outside the thermoplastic pipe. This provides effective, full-length heating of the pipe, rendering it flexible and ready for rounding and expansion. The tube may be coated with a compressible gasket material to provide a continuous seal between the existing conduit and the new pipe after the new pipe has been rounded and expanded against the interior wall of the existing conduit.

2. The rounding and expanding of the newly installed thermoplastic pipe against the interior wall of the existing conduit is refined by carrying out such steps of the process progressively from one end of the new pipe to the other, using a traveling plug. As a result, fluids in the existing conduit are expelled from the conduit ahead of the unfolding new pipe rather than being trapped as bubbles between the new pipe and the existing conduit. The traveling plug is somewhat flexible and preferably inflatable, enabling it to negotiate irregularities in the conduit and prevent wrinkles from forming in the new pipe at such points. The plug moves through the folded new pipe by fluid pressure from behind or by the force of a cable pulling it ahead. The plug is sized and constructed to enable a heating fluid introduced into the folded new pipe under pressure from behind the plug to not only exert a pushing force against the plug but also to by-pass the plug to heat and render flexible the folded new pipe ahead of the plug. A restraining cable attached to the plug controls its rate of travel through the new pipe. The plug exerts sufficient outward pressure on the walls of the new pipe to unfold it and force it tightly against the walls of the existing conduit.

3. A method and means for relieving longitudinal stress in a newly installed thermoplastic pipe after it has been rounded and expanded in the existing conduit prevents the new pipe from cracking, especially where holes are cut in the new pipe for connecting service pipes. In accordance with such method and means, the rounded and expanded new pipe is progressively reheated in short segments while adjacent sections of the new pipe are maintained in a cool condition. The reheating raises the temperature in the heated segment enough to render it plastic so that physical contraction of adjacent cool pipe sections can occur by physical stretching of the heated segment. The stress relief is carried out using a pair of spaced-apart expandable plugs tethered together and pulled slowly through the rounded and expanded new pipe. Steam under pressure injected through the rear traveling plug heats the space between the two plugs. Cool water injected into a closed space behind the rear plug under pressure provides a constant flow of cool water which cools such space and maintains the new pipe in its rounded, expanded condition until it recools.

4. A method and apparatus are provided for interconnecting a newly installed thermoplastic pipe in a main conduit and a newly installed thermoplastic pipe in an intersecting service conduit. A special packer tool is moved down the rounded thermoplastic service pipe from a remote access opening until it is adjacent its intersection with the main conduit. With the packer anchored in position by an inflatable element, a sealant carried by a cartridge in the packer is injected under pressure into the spaces where the new service pipe abuts the new main pipe to seal such spaces. After the packer is withdrawn, a special hole cutting tool moves down the service pipe to the intersection and cuts a full hole through the sealant and wall of the new main pipe to open a connection between such pipes. Both the packer tool and the cutting tool are activated remotely from the access opening through flexible power lines.

5. A method and means are provided for efficiently heating a spool of thermoplastic pipe in preparation for and during its insertion into an existing conduit. The means include a special portable stand, steam tent and spool for supporting a large coil of folded, thermoplastic pipe, transporting such coil to a job site and heating the coil at the job site. The spool includes an arbor with an internal heat chamber connectable to a source of steam through a rotary connection so that the spool can be rotated while still maintaining communication with the steam source. The arbor includes a second connection for coupling the innermost or leading end of the folded thermoplastic pipe to the heat chamber as the pipe is spooled on the arbor. During the installation process, hot steam is transmitted from the steam source through the arbor into the spool of folded pipe to heat the spooled pipe internally throughout its full length. This occurs as the heated and flexible new pipe is unspooled from the arbor and thereafter during its insertion into an existing underground conduit, thereby enabling continuous internal heating of the folded new pipe during the installation process.

6. A variation of the process of installing a thermoplastic pipe within an existing conduit comprises expansion of the slightly undersized plastic pipe under internal heat and pressure tightly against the interior walls of the existing conduit to form a composite new pipe capable of withstanding both external and internal pressures greater than either the existing conduit or the plastic pipe alone could withstand.

7. A method of repairing a short section of a long existing conduit at a position remote from an access opening involves the use of a comparably short section of rigid folded thermoplastic pipe. The section of folded thermoplastic pipe is temporarily rounded to receive a full-length inflatable bladder. The pipe section is then reheated and refolded with the bladder inside. Thereafter the pipe-bladder assembly is placed within a section of heat containment tube which is closed at both ends about the assembly. The tube is heated by the injection of steam through a closed end to render the pipe inside flexible. A pull cable connected to the opposite closed end pulls the tube and its contained and now flexible pipe-bladder assembly into the conduit and to the conduit section to be repaired. The tube is now reinjected with steam through a steam hose connected to the tube's trailing end during its insertion. When the pipe inside the tube is hot and flexible, the bladder inside is inflated from an air hose connected to the bladder to round and expand the pipe against the walls of the conduit section to be repaired. Air pressure is maintained in the bladder until the new pipe cures in its rounded, expanded condition. Thereafter the bladder is deflated, and the steam hose and pull cable are pulled from the conduit, tearing away the tube ends so that the deflated bladder can be pulled from the new pipe by its air hose.

The foregoing objectives, features and advantages of the present invention will become more apparent from the following detailed description, which proceeds with reference to the accompanying drawings.

DETAILED DESCRIPTION OF PREFERRED EMBODIMENTS USE OF HEAT CONTAINMENT TUBE

Figure 1:
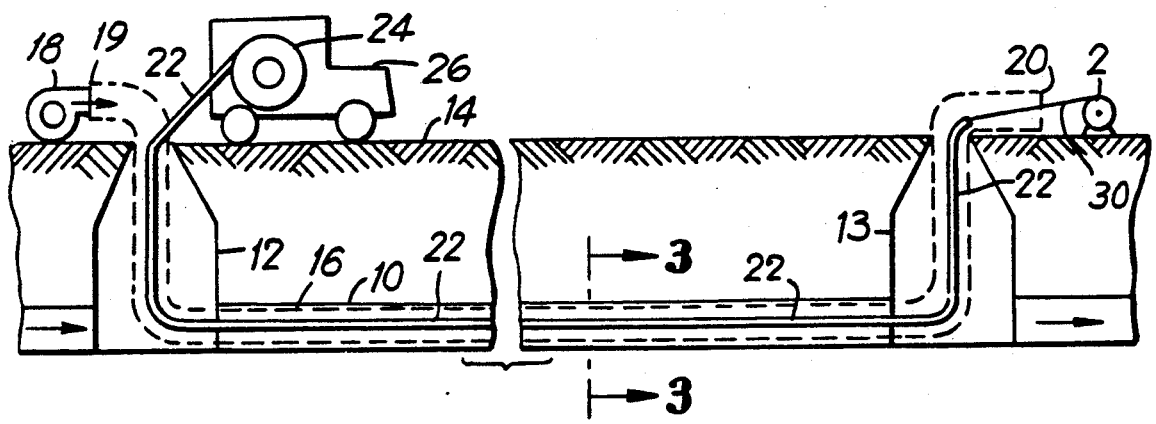
FIG. 1 is a diagram of an existing underground conduit illustrating the process of installing a new rigid thermoplastic pipe in the conduit using a heat containment tube in accordance with the invention.
Figure 2:
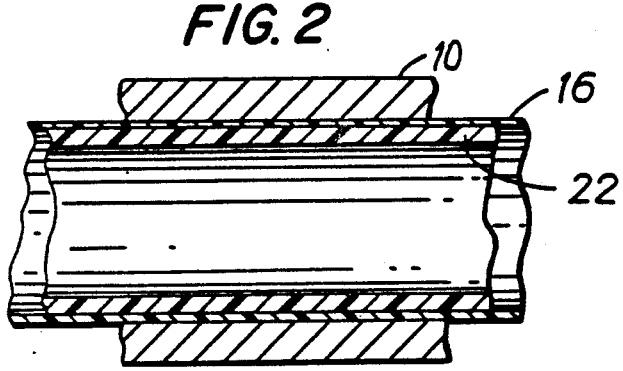
FIG. 2 is a longitudinal sectional view through a short section of the existing conduit of FIG. 1 showing the new thermoplastic pipe rounded and expanded within the conduit and the heat containment tube in place.

Referring to FIG. 1, an existing underground conduit 10 extends between manholes 12, 13 providing access to the conduit from ground level 14. A heat containment tube 16 extends from an airblower 18 at one tube end 19 down through manhole 12, through the length of existing conduit 10, and up through manhole 13 to a closed or sufficiently constricted opposite end 20.

Figure 3:
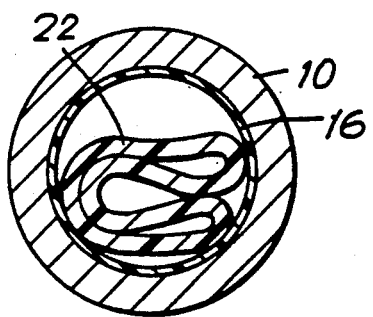
FIG. 3 is a cross-sectional view through the existing conduit of FIG. 1, taken along the line 3—3 of FIG. 1, prior to expansion of the new pipe within the heat containment tube.
Figure 4:
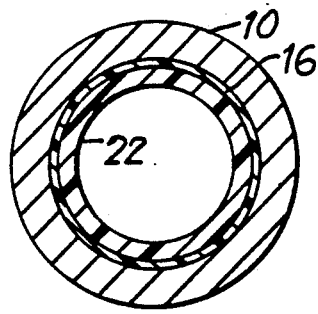
FIG. 4 is a sectional view similar to FIG. 3 but after the new pipe has been rounded and expanded to force the heat containment tube against the interior wall of the existing conduit to form a seal between the newly installed pipe and the existing conduit.

A length of rigid thermoplastic pipe 22, but in a heated, flexible and folded condition, as described more fully in the prior related applications, is pulled into the existing conduit through tube 16 by a pull cable 30 connected to a cable winch 28 adjacent to manhole 13. The folded condition of thermoplastic pipe 22 is illustrated in FIG. 3 within conduit 10 and heat containment tube 16. The thermoplastic pipe 22 is shown in its rounded and expanded condition in FIG. 4. Pipe 22 is typically heated and rendered flexible for insertion into the conduit by heating a spool 24 of the folded pipe within a housing 25 on a vehicle 26 as described in more detail in prior related applications.

The heat containment tube 16 is a thin, flexible, tubular membrane manufactured from any material which is strong, pliable, air and water tight, and capable of withstanding live steam at high temperatures of up to 250° F. and substantial internal pressures. A suitable membrane for this purpose has been found to be a nylon reinforced polyethlyene, 6 mils thick, although no doubt other suitable membrane material would also suffice, ranging in thickness from about 3 to 20 mils.

The heat containment tube serves at least six important purposes. First, it facilitates heating of and maintaining hot folded thermoplastic pipe after insertion of such pipe into the conduit to be reconstructed. Second, it keeps water and other fluids in the existing conduit from contacting and cooling the thermoplastic pipe, thereby promoting effective heating and preventing heat loss from the pipe. Third, the tube keeps steam or other hot fluid used in heating the plastic pipe within the tube from escaping up service pipes or through breaks in the existing conduit. Fourth, the tube keeps steam from damaging existing or connected pipes. Fifth, the tube can be coated with one or more layers of a compressible gasket material so that when the pipe is rounded and expanded to press the heat containment tube against the walls of the existing conduit, a continuous seal is provided along the rebuilt pipeline between the existing conduit and the new thermoplastic pipe. Sixth, where cool fluids are within or flowing into the existing conduit, the heat containment tube can be pressurized and maintained under sufficient pressure so that fluids within such conduit are expelled and other fluids are prevented from entering.

The process of installing a new pipe using the heat containment tube is as follows:

First, the heat containment tube is pulled through a section of the existing conduit from one manhole 12 to the next manhole 13 with some extra length of the tubing extending from each end of the section of conduit to be rebuilt. The diameter of the tube is preferably at least as great or greater as the inside diameter of the existing conduit.

With tube 16 extending the full length of conduit 10, the end 19 of the tube is temporarily connected to air blower 18 and air is blown through the tube to expand it. With the tube expanded, the folded pipe 22, heated and flexible, is pulled through the heat containment tube using winch 28 and cable 30.

With the folded pipe 22 in place within the heat containment tube as shown in FIGS. 1 and 3, a hot fluid, preferably steam, is introduced into end 19 of the tube while the opposite end 20 is closed or restricted. If fluids need to be expelled or prevented from entering the existing conduit, steam or a combination of steam and air are injected into the heat containment tube in sufficient volume to maintain enough pressure within the tube to expel or prevent the entrance of such fluids. If steam is used, a steam hose connected to a source of steam (not shown) can be connected to end 19 of the tube, and the other end 20 can be tied shut. The steam is forced down through the length of the tube on the outside of folded pipe 22 and then back in the opposite direction through the tube but within folded pipe 22. Alternatively, the steam can be introduced initially into an end of folded pipe 22 and then passed back in the opposite direction on the outside of the pipe within tube 16. Another alternative is to restrict the tube at end 20 but allow the hot fluid to vent from such end while adding such hot fluid inside both the tube and the plastic pipe at end 19. Each routing of the steam provides quick and effective full-length internal and external heating of pipe 22.

With the thermoplastic pipe in a heated, flexible, condition within the tube, the pipe is rounded and expanded in one of the several ways previously described in the prior related applications or in another way to be described in this application. If the heat containment tube is supplied with a coating of compressible gasket material, a continuous seal is formed between the interior wall of the existing conduit and the exterior wall of the rounded and expanded pipe 22.

Figure 5:
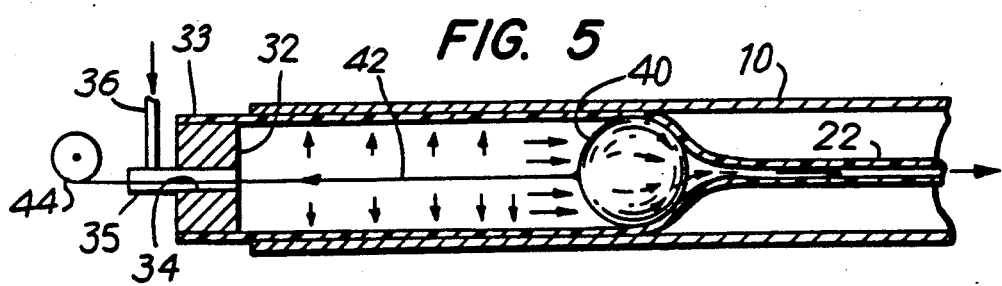
FIG. 5 is a diagram illustrating the process of using a traveling plug in a folded thermoplastic pipe within a conduit to progressively round and expand the pipe against the interior wall of the existing conduit, including the use of pressurized steam behind the plug to propel it through the pipe and the use of a restraining cable to control the speed of travel of the plug through the pipe.

Method and Apparatus for Progressively Rounding and Expanding Thermoplastic Pipe Within An Existing Conduit FIG. 5 illustrates a method and apparatus for progressively rounding and expanding the folded thermoplastic pipe 22 within the existing conduit 10 after the pipe has been installed in its folded condition in the conduit. The method has for its purpose the rounding and expansion of the folded plastic pipe 22 progressively from one end of the conduit section to the other so that any fluids in the existing conduit are expelled therefrom ahead of the unfolding plastic pipe rather than being trapped as bubbles between the plastic pipe and the existing conduit during the rounding and expansion process. The progressive rounding and expansion process also helps provide the new pipe with a smooth interior surface when rounded despite possible irregularities in the existing conduit.

Apparatus to perform the process includes a flow-through end plug 32 sized to be installed at a rounded end 33 of the folded thermoplastic pipe 22. Such plug includes a passage 34 therethrough receiving an entrance pipe 35 to which is connected a steam or other hot fluid supply pipe 36 connected to a remote source (not shown) of such hot fluid. Passage 34 of plug 32 also allows a restraint cable 42 to slide freely therethrough for a purpose to be described.

A sliding ball or plug 40 is sized and designed to be moved through the folded plastic pipe 22, unfolding, rounding and expanding the pipe as it moves. Plug 40 is preferably an inflatable rubber ball having a slotted surface which allows hot steam or other pressure fluid injected from behind it to by-pass the ball to some extent to enter and thus preheat the folded plastic pipe ahead of the ball to render it sufficiently flexible that it readily unfolds as the ball approaches.

Plug 40 can either be propelled by pressure fluid from behind or by a pull cable (not shown) attached to a leading surface of the ball. In the illustrated embodiment of FIG. 5, the plug 40 is propelled by pressure fluid from behind, entering through end plug 32. Plug 40 exerts sufficient outward pressure on the walls of the unfolding plastic pipe 22 when heated and flexible to force the walls of the plastic pipe tightly against the walls of the existing conduit, with the help of the pressure fluid from behind. Yet traveling plug 40, being an inflatable rubber ball, has sufficient flexibility to negotiatate any irregularities encountered in the existing conduit during its travel. The ball, with its slotted surface, is sized to restrict the flow of the heated pressure fluid behind it so that the ball is propelled through pipe 22. Yet the ball allows a sufficient amount of such pressure fluid to pass over its slotted surface and into the folded plastic pipe ahead of it to heat the folded pipe ahead of the ball and enable the ball to perform its rounding and expansion function.

A trailing surface of ball 40 has restraining cable 42 connected to it. Cable 42 passes out through passage 34 of end plug 32 to a restraining winch or other suitable restraining mechanism 44 to control the speed and monitor the progress of the ball through pipe 22.

In performing the method, the folded pipe 22 is installed full length in the length of conduit 10 to be repaired in accordance with one of the methods described in this and the prior related applications. Thereafter, end 33 of prior pipe 22 is heated and rounded so that the traveling ball 40 with restraint cable 42 attached can be inserted into such end. After insertion of ball 40, end plug 32 is inserted into end 33 of pipe 22 to close such end.

Next, a heating fluid, such as hot steam, is injected under pressure into the rounded end of pipe 22 through pipe 36 and passage 34 of end plug 32. During the initial injection of the hot pressure fluid, traveling ball 40 is restrained by cable 42 to prevent its forward movement. This allows the steam to thoroughly heat the plastic pipe 22 both behind and in front of ball 40 in preparation for the controlled movement of the ball through the pipe.

When pipe 22 is heated sufficiently, traveling ball 40 is allowed to progress at a controlled speed through the folded pipe, thereby progressively rounding and and expanding it. Plug 40 moves under the pushing force of the pressure fluid pushing from behind or optionally by a pulling force from a pull cable (not shown) attached to a leading side of the ball. In either case, pressure is maintained behind ball 40 to keep pipe 22 expanded until cooled, especially if pipe 22 is manufactured in a folded condition so that it tends to return to such condition when heated and flexible. Such pressure can be maintained behind ball 40 after the full length of pipe 22 has been expanded by injecting a cooling fluid under pressure through end plug 32. The progress of traveling ball 40 through pipe 22 is controlled and monitored by restraint cable 42.

With the process as described, any water or other fluid lying within conduit 10 is expelled therefrom ahead of the ball. The resulting expanded interior walls of plastic pipe 22 are smooth and unwrinkled.

Figure 6:
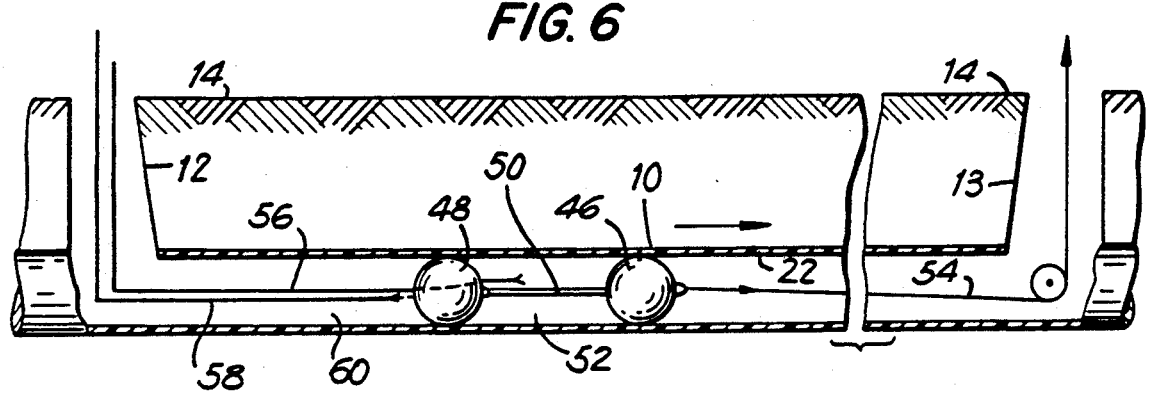
FIG. 6 is a diagram illustrating the method of stress relieving a newly installed, rounded and expanded thermoplastic pipe within an existing underground conduit.

Method and Apparatus for Relieving Longitudinal Stresses in a Previously Installed Thermoplastic Pipe FIG. 6 illustrates a method of relieving longitudinal stresses in a previously installed thermoplastic pipe 22 within the existing conduit 10 accessed by manholes 12, 13 below ground level 14. Longitudinal stresses frequently develop in pipe 22 during its installation, when the folded pipe is heated from approximately 70° F. to up to 220° F. for installation, rounded, expanded against the existing conduit, and then cooled in place. Typical thermoplastic pipe used in such installations elongates approximately 5.4 inches per 100 feet because of thermal expansion. When such pipe is rounded and expanded, it is physically locked into the existing conduit, especially at the joints between abutting sections of the conduit. Subsequent cooling of the thermoplastic pipe induces contraction forces and thus longitudinal stresses. Such stresses can be so severe that the pipe can crack, especially where holes are cut for connecting pipes.

In accordance with the present method, relief of such longitudinal stresses is accomplished by progressively reheating short segments of the previously rounded and expanded plastic pipe while maintaining adjacent plastic pipe sections in a cool condition. The reheating is sufficient to plasticize the heated segment so that physical contraction of the adjacent cool pipe sections can occur through physical stretching of the heated segment.

This method of stress relief is accomplished as follows, with reference to FIG. 6. Two expandable or inflatable traveling plugs 46, 48 are tethered together by a tether line 50, a fixed distance apart to define a space 52 therebetween. The traveling plugs are pulled into the previously expanded plastic pipe 22 by suitable means such as the pull cable 54 connected to a winch (not shown) adjacent to manhole 13.

A steam hose 56 is attached to rear plug 48 and extends through the plug to inject steam into space 52 between plugs 46 and 48. A steam supply (not shown) is provided adjacent manhole 12. Steam under pressure is injected from the steam supply through steam hose 56 and rear plug 48 into space 52 to heat such space, thereby heating and rendering plastic or flexible the expanded pipe 22 within such space.

A water hose 58 is also attached to rear plug 48 so that its nozzle injects a constant flow of cooling water into the space 60 behind rear plug 48. Such space 60 is filled with water under suitable pressure so that any heated plastic pipe exposed as plug 48 moves slowly forward (to the right in FIG. 6), is maintained in a rounded condition as it cools. During this process, and as the traveling plugs 46, 48 proceed through the rounded plastic pipe 22, pressure in heated space 52 between the plugs is maintained somewhat higher than the pressure in space 60 behind the rearmost plug to insure that no cooling occurs in space 52. The rate of travel of the plugs through the pipe must be sufficiently slow to allow for a thorough reheating and plasticizing of each plastic pipe segment before it is recooled.

Figure 7:
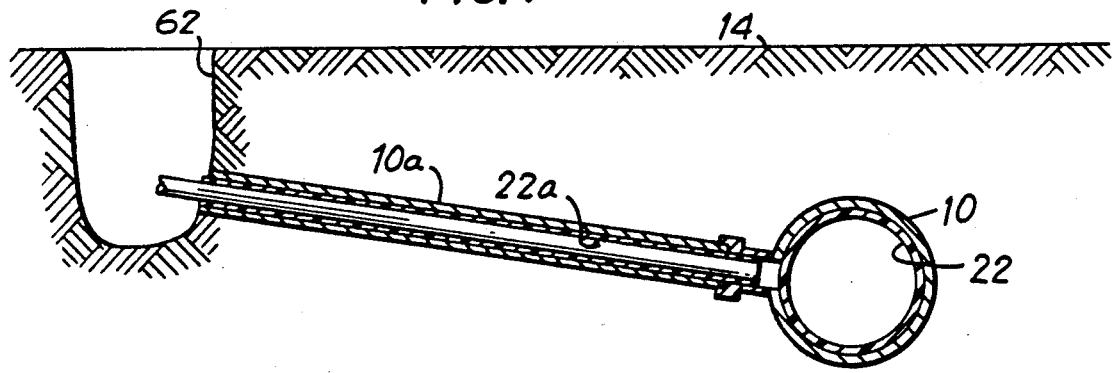
FIGS. 7, 8 and 9 are diagrams illustrating schematically and progressively a method of interconnecting a new thermoplastic pipe installed in an existing main conduit and a new thermoplastic pipe installed in an existing service conduit.
Figure 8:
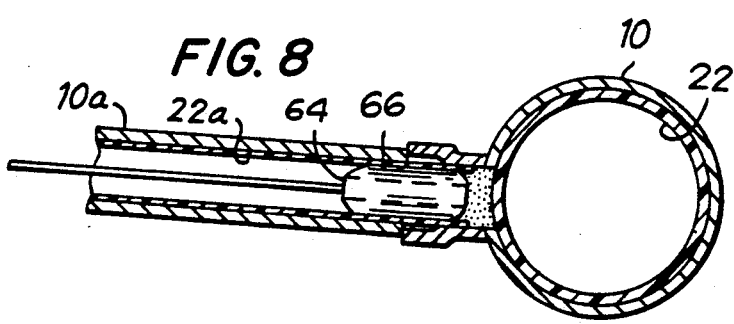
Figure 9:
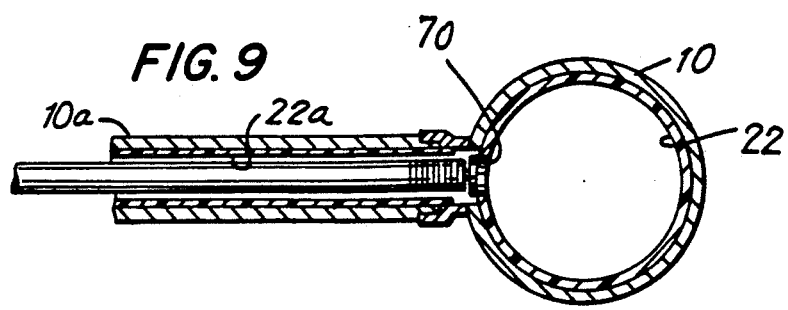

Method and Apparatus for Interconnecting A New Thermoplastic Pipe Within A Main Conduit and A New Thermoplastic Pipe Within An Intersecting Service Conduit Referring to FIGS. 7, 8 and 9, a method of interconnecting a newly installed thermoplastic pipe 22 within a main conduit 10 and a newly installed thermoplastic pipe 22a within an intersecting service conduit 10a is illustrated.

Referring first to FIG. 7, the main pipe 22 is installed in an existing main conduit 10, such as a sewer main, according to one of the processes described in this and prior related applications. The service pipe 22a for existing service conduit 10a is also installed in accordance with one of the previously described methods in this or related applications. In general, such process involves locating the connecting service conduit 22a, gaining access to it by uncovering the service conduit at an access opening 62 remote from its intersection with main 10, and pushing a folded length of heated and flexible pipe 22a into the service conduit 10a, or otherwise installing such pipe, until its downstream or leading end abuts or is adjacent to the new main pipe 22 at the existing connection of the service conduit to the main conduit. The folded service pipe 22a is then rounded and expanded against the interior wall of the existing service conduit in the usual manner previously described in related applications.

Then, as shown in FIG. 8, a special packing tool 64 having an inflatable element 66 is pushed down the rounded plastic service pipe 22a from access opening 62 until the tool is as close as possible to the end of service pipe 22a and its intersection with the main pipe 22. Then inflatable element 66 of the packing tool is inflated to anchor the packing tool in place at the intersection. The packing tool contains a sealing material within a cartridge cylinder and means for injecting the sealant under pressure from the cartridge into the spaces and gaps between the end of service pipe 22a and the adjacent wall of main pipe 22. The sealant may be a suitable chemical grout, preferably of the foaming or expandable type, water activated, such as grout No. 202 or No. 220 as manufactured by 3M Company. The grout is forced into any cracks, joints, or annular spaces to seal the newly installed plastic pipes 22 and 22a together at their intersections. After the grout has set, the packer is withdrawn from the service pipe 22a, through access opening 62.

Then, referring to FIG. 9, a hole cutting tool 68 is pushed down through service pipe 22a from access openings 62 to its sealed intersection with main pipe 22. The hole cutting tool is used to cut a full hole 70 through the sealant and the wall of main pipe 22, thereby opening a fluid connection from service pipe 22a into main pipe 22.

Figure 10:
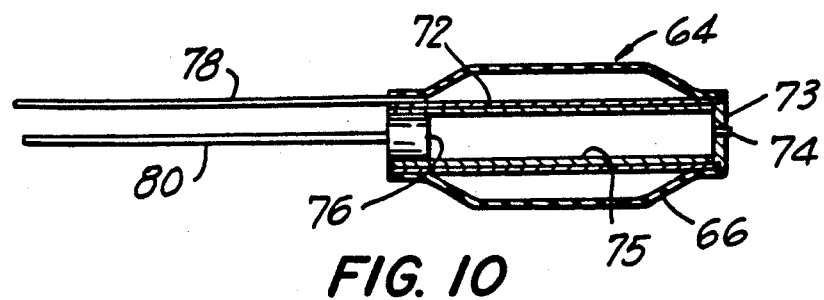
FIG. 10 is a schematic sectional view of a packing tool for performing the process of FIGS. 7-9.
Figure 11:
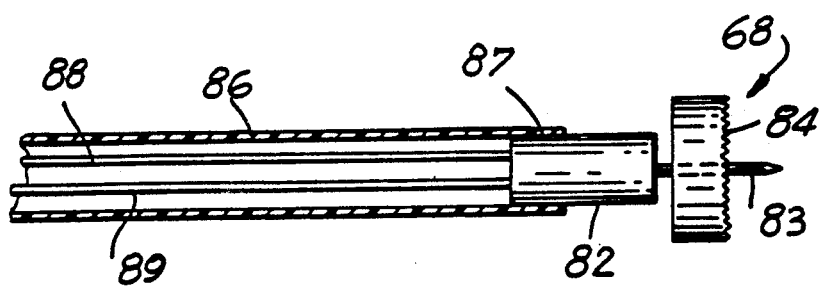
FIG. 11 is a schematic view of a cutting tool for performing the process of FIGS. 7-9.

Referring to FIGS. 10 and 11, the packing tool 64 and hole cutting tool 68 are shown schematically and described in greater detail.

Packing tool 64 includes a metal or other rigid tubular housing 72 closed at its rear end and approximately one-half the diameter of service pipe 22a. A screw-on cap 73 closes the opposite, leading end of housing 72. Cap 73 has a hole through which a spout 74 of a cylindrical canister 75 within housing 72 fits. Canister 75 is disposable and contains the sealant or grout to be used in the sealing process.

Inflatable element 66 is a tubular rubber sleeve which fits tightly against the exterior of housing 72 when not inflated and which seats against and grips the interior walls of the rounded service pipe 22a when inflated. Canister 75 includes a plunger 76 which is initially at its rear end and which is pushed forwardly under fluid pressure to expel sealant or grout through spout 74 into the spaces to be sealed.

An air hose 78 connected at one end to the interior of inflatable element 66 and at the other end to a remote source of pressurized air adjacent access 62 inflates element 66. Another hose 80 is connected to the air source or to a source of water or other pressure fluid (not shown) and to the interior of canister 75 behind plunger 76 to drive the plunger forward through the canister to expel the grout through nozzle 74.

The cutting tool 68 of FIG. 11 includes a small diameter waterproof motor 82 which may be powered by hydraulic fluid, air or electricity. An annular rotary saw tooth cutting blade 84 is mounted on a drive shaft 83 of the motor for rotation when the motor is energized. A strong, relatively inflexible hose 86 is connected at one end 87 to motor 82. The hose leads from the motor through the service pipe 22a to the access opening 62. It is used to push the cutting tool into the service pipe and to its intersection with the main pipe. It is also used to hold and position cutting blade 84 during the cutting operation. Within positioning hose 82, power lines consisting of either hoses or wires 88, 89 as required, transmit power from a remote power source (not shown) to motor 82.

Improvements in Heating Spools of Folded Thermoplastic Pipe for Insertion in Existing Conduits Typically, the rigid thermoplastic pipe, in folded form, is spooled while flexible during manufacture and subsequently heated and removed from the spool during insertion. Such removal requires the spool to be heated in an enclosure to a high temperature. Because many of the wraps of pipe on the spool are covered by overlying wraps, and the entire spooled pipe is heated externally within the enclosure, heating must be prolonged for all wraps to become sufficiently heated and flexible for unspooling and insertion. The following described means and method are provided for speeding up the heating of a spool of such pipe and for maintaining the pipe in a heated, flexible condition during unspooling and after, and during its insertion into an existing underground conduit. The method and means enable the pipe to be inserted into long runs of conduit while remaining heated and flexible throughout its length.

Figure 12:
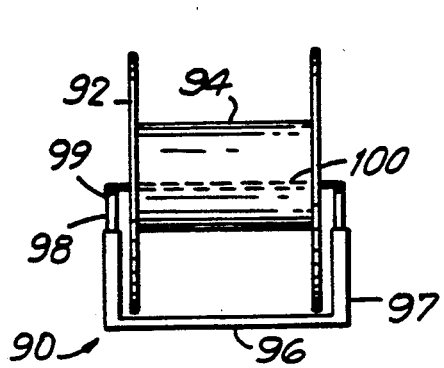
FIG. 12 is a schematic front elevational view of a portable spool stand and spool assembly used in accordance with the present invention.
Figure 13:
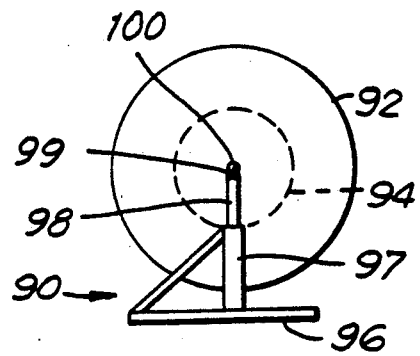
FIG. 13 is a schematic side elevational view of the assembly of FIG. 12.

Referring to FIGS. 12 and 13, a lightweight and inexpensive portable stand 90 is provided for supporting a spool 92. Spool 92 has a central cylindrical arbor 94 onto which a supply of thermoplastic pipe (not shown) in a folded, flexible condition can be wound and stored until ready for use. The stand includes a flat metal base plate 96 having opposed upright frame members 97. Upright frame members 97 are tubular and receive telescoping extension arms 98 having cradles 99 at their upper ends for supporting a spool support axle 100. Axle 100 extends through the arbor 94 of spool 92 to support the spool on the stand. Extension arms 98 can be extended and retracted within upright frame members 97 to adjusted positions by a small jack (not shown) or by providing fluid-operated hydraulic cylinders within upright frame members 97. Locking pins 91 extending through indexed pin openings in frame members 98 and extension arms 98 lock the arms in their adjusted positions. Thus, extension arms 98 can raise and lower the supported spool 92. By raising the spool from the level of base plate 96, the spool can be allowed to rotate about axle 100, thereby allowing the withdrawal of folded thermoplastic pipe from the spool.

Figure 14:
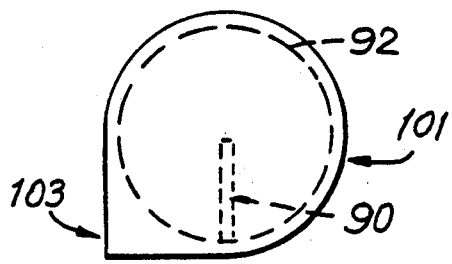
FIG. 14 is a schematic side elevational view of a steam tent for use in conjunction with the spool stand assembly of FIGS. 12 and 13.

FIG. 14 discloses a steam tent enclosure 101 for enclosing and containing the stand and spool assembly described in FIGS. 12 and 13 or comparable assemblies. The steam tent is an enclosure intended to contain hot steam for heating the enclosed spool 92 of thermoplastic pipe to render it flexible for insertion into an existing conduit. The steam tent is made of a nylon-reinforced vinyl, canvas or other such material which is light, flexible, airtight, and able to withstand the high temperatures of hot steam.

The steam tent enclosure is built with such openings as are needed to install it about a spool and its stand, and to remove new thermoplastic pipe for insertion. The tent must also be provided with an access opening for the injection of live steam therein. The openings are zippered, as shown with respect to pipe access opening 103, or provided with other suitable closure means that can be secured so that the injected steam is contained in the tent with minimal leakage.

Figure 15:
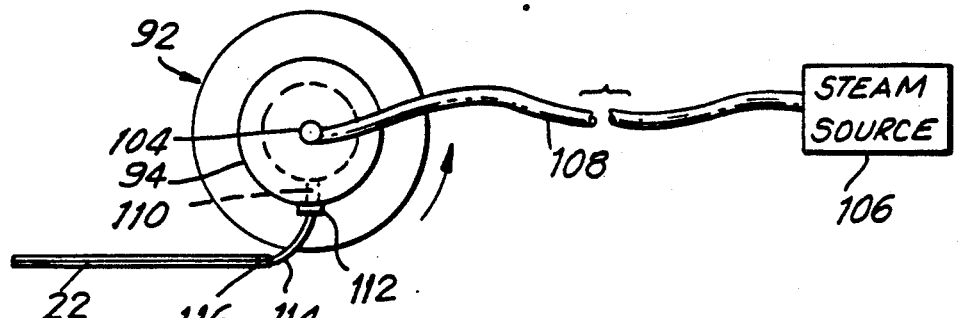
FIG. 15 is a schematic side elevational view of a spool with a special arbor having an internal steam chamber for use in efficiently heating a spool of folded thermoplastic pipe during unspooling and insertion and during insertion of the pipe into an existing conduit in accordance with the present invention.

Referring to FIG. 15, spool 92 for supporting a coil of folded thermoplastic pipe 22 includes the previously-identified arbor 94. The arbor is provided with an internal steam chamber 102 which has a rotary end connection at 104 for connecting the chamber to a source of steam 106 through a steam hose 108. A passage 110 extends from chamber 102 to a surface connection 112 of the arbor to a short section of flexible steam hose 114. The free end of hose 114 is connected to the rounded leading end 116 of a length folded thermoplastic pipe as such pipe comes from the manufacturing process, hot, flexible and ready to be spooled. Thus, when pipe 22 is spooled on arbor 94, its leading end 116 remains connected to steam chamber 102 and can thus be connected through rotary connection 104 to steam source 106.

When the spooled and folded pipe 22 is ready to be installed in an existing underground conduit, the spool is transported to the job site and connected to the source of steam 106 via steam hose 108. When this occurs, steam is injected into the internal passages of the spool of folded pipe 22 from steam chamber 102 and flexible hose 114, to heat and render flexible the full length of spooled pipe 22 very quickly and efficiently. The injection of steam and, thus, heating of spooled pipe 22 continues as the pipe is unspooled from arbor 94 and inserted into an underground conduit. Even as pipe 22 is pulled, pushed, or otherwise moved through an underground conduit far removed from spool 94, it continues to be injected with live steam. It therefore remains flexible during the entire installation process.

The foregoing method of injecting hot steam into spooled and folded thermoplastic pipe has the advantages of: (1) ensuring that all wraps of the spooled pipe are properly heated before they are attempted to be removed from the spool; (2) speeding up the heating of the folded and spooled pipe; (3) enabling the folded pipe to be heated after being withdrawn from the spool and during its insertion into an existing, underground conduit; and (4) providing consistently soft, pliable pipe during the installation process. This latter advantage protects the heat containment tube, if used, reduces the forces needed to pull the pipe through the existing conduits, and allows for longer pulls through conduits. Of course, such heating process also enables the thermoplastic pipe to be pulled through manholes or around curves in pipelines where the pipe must accommodate changes in alignment of the existing conduit.

Figure 16:
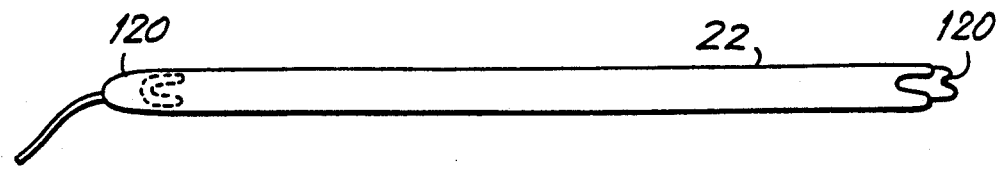
FIG. 16 is a schematic elevational view of a section of folded new pipe having a full-length inflatable bladder inside and a connected air hose for use in a process of the invention for repairing short sections of existing conduit.
Figure 17:
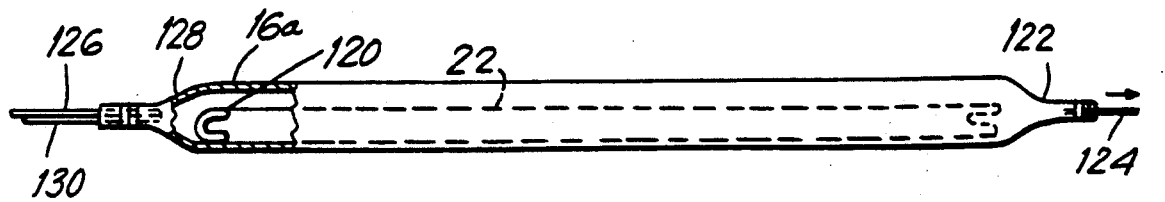
FIG. 17 is a schematic view similar to FIG. 16 but including a heat containment tube enclosing the assembly of FIG. 16 for use in performing a process of repairing short sections of existing conduit.

Method and Apparatus for Repairing Short Sections of Existing Underground Conduit from Remote Access Openings Referring to FIGS. 16 and 17, a method and apparatus are illustrated for repairing short sections of long existing conduits using the thermoplastic pipe 22 previously described. The method is useful in making spot repairs in an existing pipeline where the section to be repaired is relatively short compared to the overall length of the pipeline. However, the method can be used for repairing sections of almost any desired length.

First, a section of folded thermoplastic pipe 22 corresponding in length to the length of the section of conduit to be repaired is cut from a supply spool or other source of the thermoplastic pipe. The section 22 is heated and rendered flexible, and then rounded in one of the previously-described manners of this or related applications. When pipe 22 is rounded, a full-length inflatable bladder 120 is placed inside the pipe. Pipe 22 is then reheated and refolded with the deflated inflatable bladder inside.

A section of heat-containment tube 16a, longer than the bladder-pipe assembly, is provided and the bladder-pipe assembly is placed inside the tube as shown in FIG. 17. The heat containment tube is closed at its leading end 122 and a pull cable 124 is attached to such end.

An air hose 126 is connected to the interior of the inflatable bladder 120 at the trailing end 128 of the heat-containment tube. A steam hose 130 is inserted inside the trailing end of the heat-containment tube, and trailing end 128 of the tube is closed and tied about the air and steam hoses.

Steam is then injected into the heat-containment tube through steam hose 130, heating thermoplastic pipe 22 inside and rendering it soft and flexible. At this point, the entire assembly, including the heat-containment tube, is pulled into the existing conduit and to the section of the conduit to be repaired using pull cable 124 pulled from a downstream manhole or other access opening (not shown).

At the repair site within the conduit, steam is again pumped into the heat-containment tube through steam hose 130 to again heat and render flexible and soft the thermoplastic pipe 22 inside. When the plastic pipe is sufficiently hot and flexible, bladder 120 inside pipe 22 is inflated with air through air hose 126 from a remote source at an access opening (not shown). Inflation of the bladder rounds and expands plastic pipe 22, forming it tightly against the interior walls of the section of existing conduit to be repaired. The supply of steam is then cut off, and the rounded and expanded pipe 22 is allowed to cool while the bladder remains inflated to continue to apply internal pressure to pipe 22. When pipe 22 has cooled and set in its rounded form, it is firmly anchored in place within the existing conduit. Therefore, when pull cable 124 is pulled, it tears end 122 from the heat-containment tube. When steam hose 130 is pulled, it tears the opposite end 128 from the heat-containment tube. The inflatable bladder is deflated and pulled from the rounded pipe 22 by pulling on air hose 126. The remainder of the heat-containment tube remains in place, pressed between the outer walls of expanded pipe 22 and the interior walls of the repaired conduit section, providing a seal between the pipe and conduit. If desired, the heat-containment tube can be coated with a gasket material to provide a watertight seal at the repaired pipe section.

Method of Making a Composite Pipe Section to Strengthen an Existing Pipe Section The folded, rigid thermoplastic pipe 22 previously described in this and related applications can also be used to strengthen existing pipe by forming with the existing pipe what is, in effect, a new composite pipe. The composite pipe has greater strength to resist external and internal forces than either the original existing conduit or the thermoplastic pipe acting alone.

To provide this property, the folded thermoplastic pipe is heated and expanded inside the existing conduit. The thermoplastic pipe is selected to have a normal rounded external diameter slightly less than the internal diameter of the existing conduit to be strengthened. With the folded thermoplastic pipe within the section of conduit to be strengthened, the pipe is rounded and expanded. The new pipe is expanded tightly against the interior walls of the existing conduit so that it exactly fits such conduit. As a result, a composite pipe is formed comprising the outer existing conduit and the inner thermoplastic pipe. The structural ability of the thermoplastic pipe to withstand crushing loads such as earth loads, superimposed loads, and the like, is substantially increased because of the sidewall support provided by the existing pipe. Moreover, the structural ability of the composite pipe to withstand both exterior and interior forces is greatly augmented because the two pipes act as a single structural entity.

The importance of the foregoing discovery is that the thermoplastic pipe can be used to strengthen an existing conduit where the existing conduit may be failing structurally; or where fills, buildings, or other superimposed loads have been imposed for which the existing conduit was not designed; or where an existing conduit, previously designed as a gravity pipe, is to be converted to a pressure pipe.

The foregoing discovery is also important because it enables the use of a relatively thin-walled thermoplastic pipe as a rigid liner inside a corroding or distressed pressure pipe to increase the effective strength of the existing pipe. The thermoplastic pipe in such a situation need not be designed to withstand all of the internal pressure of the system in which it is used. Instead, the pipeline to be repaired can be designed as a composite pipe consisting of the existing pressure conduit and the newly installed thin-walled thermoplastic pipe.

Having illustrated and described a number of improvements in the processes and apparatuses for installing a rigid thermoplastic pipe inside an existing conduit as described in the prior related applications, it should be apparent to persons skilled in the art that such improvements can be modified in arrangement and detail without departing from the principles of my invention as illustrated by such improvements. I claim as my invention all such improvements, variations and modifications, and equivalents thereof, as come within the true spirit and scope of the following claims.

I claim:

1. A method of installing a normally substantially rigid thermoplastic pipe in a length of existing conduit comprising the steps:

inserting a flexible tubular member which is substantially air and water tight into the length of an existing conduit to be lined such that at least one end of the tubular member is accessible at an end of the length of conduit to be lined, inflating the tubular member to at least a partially rounded condition to provide a controlled environment within the tubular member, heating a length of the thermoplastic pipe in a collapsed condition wherein the cross-sectional dimensions are less than the conduit to render the thermoplastic pipe deformable, and inserting the thermoplastic pipe into the tubular member such that the thermoplastic pipe extends the full length of the length of conduit in which the tubular member is inserted in the conduit, with one end of the tubular member at least restricted and with the collapsed thermoplastic pipe inside, forcing a hot fluid into the tubular member and the collapsed thermoplastic pipe from the other accessible end to heat the thermoplastic pipe inside and outside throughout its length and thereby render the normally rigid collapsed thermoplastic pipe deformable, and while the thermoplastic pipe is deformable, applying an internal expansion pressure to said pipe to expand the pipe from the collapsed condition to the internal configuration of the conduit with the tubular member retained between the expanded thermoplastic pipe and the conduit.

2. The method of claim 1 including cooling the thermoplastic pipe while maintaining the internal expansion pressure within said pipe such that said pipe maintains its expanded shape within said conduit when the expansion pressure is removed.

3. The method of claim 1 wherein said expansion pressure is applied by forcing a hot fluid under pressure through said thermoplastic pipe.

4. The method of claim 1 wherein the expansion pressure is applied by moving a sliding plug through the folded plastic pipe inside the tubular member while the pipe is hot and deformable.

5. The method of claim 1, wherein the rigid thermoplastic pipe is heated and rendered deformable prior to and during its insertion into the length of conduit.

6. The method of claim 1 wherein the tubular member is first inserted into the length of conduit and at least partially expanded and then the thermoplastic pipe is inserted into the tubular member while the tubular member is in its expanded condition.

7. The method of claim 1 including using a tubular member constructed of a thin flexible reinforced plastic membrane material having a thickness in the range of 3 to 20 mils.

8. The method of claim 1 including using a tubular member including a coating of resilient compressible gasket material and expanding said thermoplastic pipe to an expanded condition sufficient to cause the gasket material of the tubular member to seal any annular spaces between said pipe and said conduit.

9. The method of claim 1 wherein said flexible tubular member when subjected to internal pressure has a normal rounded outside diameter at least as great as the inside diameter of the conduit.

10. The method of claim 1 wherein said flexible tubular member is inflatable under internal pressure to a rounded diameter at least as great as the inside diameter of the conduit and said pipe is expanded under internal pressure to compress said tubular member against the inside wall of the conduit.

11. The method of claim 1 wherein the length of conduit has an at least partially collapsed section and said tubular member is subjected to sufficient internal pressure to jack the collapsed section back into substantial conformance with the remainder of the length of conduit.

12. The method of claim 1 wherein the flexible tubular member is sealed at one end and is internally pressurized from the opposite end under sufficient pressure to force the tubular member against the interior walls of the length of conduit and thereby seal the thermoplastic pipe within the tubular member from fluids external to the tubular member.

13. The method of claim 1 wherein said one end of the tubular member is closed and the hot fluid flows through the tubular member in one direction outside the collapsed thermoplastic pipe and in an opposite direction inside the thermoplastic pipe.

14. The method of claim 1 wherein said one end of the tubular member is restricted but not closed and the hot fluid is forced into both the tubular member and the collapsed thermoplastic pipe from said other end such that the hot fluid flows through the tubular member from said other end inside and outside the thermoplastic pipe and is vented at said one end.

15. The method of claim 1 including, before inserting the thermoplastic pipe into the tubular member, internally pressurizing the tubular member with a pressure fluid under sufficient pressure to expel any fluids within the existing conduit and prevent the entrance of additional fluids into the conduit, and maintaining the internal pressure within the tubular member until the thermoplastic pipe is expanded.

16. The method of claim 15 wherein the pressure fluid is a gaseous fluid comprising steam.

17. A process of lining an existing conduit with a substantially rigid thermoplastic pipe, comprising:
heating a thermoplastic pipe which is in a reduced condition with dimensions less than the dimensions of the existing pipeline and is within a flexible tubular member which is substantially air and water tight with one end of the tubular member restricted to provide a controlled environment within the tubular member to render the thermoplastic pipe deformable; and,
inserting the collapsed thermoplastic pipe within the flexible tubular member into the existing conduit;
forcing a hot fluid into the tubular member and the collapsed thermoplastic pipe from the accessible end to heat the thermoplastic pipe inside and outside throughout its length and thereby render the normally rigid collapsed thermoplastic pipe deformable,
applying internal pressure to the deformable thermoplastic pipe to expand the deformable thermoplastic pipe from the reduced condition to a cross-section substantially similar to the cross-sectional dimensions of the existing pipeline with the flexible tubular member between the thermoplastic pipe and the conduit; and
cooling the expanded thermoplastic pipe while maintaining the internal pressure to render it substantially rigid in the expanded condition.

18. The process of claim 17, wherein the flexible tubular member is placed within the existing pipeline and the thermoplastic pipe in reduced condition is fed through the tubular member.

19. The process of claim 18, and including the step of heating the thermoplastic pipe to render it deformable before inserting it into the tubular member within the existing pipeline.

20. The process of claim 17, including the step of moving a traveling plug through the interior of the expanding new thermoplastic pipe.

* * * * *